Aug. 5, 1941.   F. J. CORNICK   2,251,352
GAUGE FOR DETERMINING RATE OF RAINFALL
Filed Sept. 2, 1938

INVENTOR.
FREDERICK J. CORNICK
BY
ATTORNEY.

Patented Aug. 5, 1941

2,251,352

UNITED STATES PATENT OFFICE 2,251,352

GAUGE FOR DETERMINING RATE OF RAINFALL

Frederick J. Cornick, Pasadena, Calif.

Application September 2, 1938, Serial No. 228,139

15 Claims. (Cl. 73—151)

This invention relates to rain gauges, and has for an object a provision of a rain gauge for measuring rate, or intensity, of rainfall, instead of quantity, as heretofore.

Another object is to provide apparatus adapted to measure rate of liquid flow of very low intensity, such as that resulting from the collection of falling rain by a rain receiver of standard size.

A further object is to provide, in apparatus of the character indicated, means for measuring very low rates of flow, which relies for its operation upon the action of the force of gravity upon the contents of a bucket, which contents are variable in accordance with variations in rate of the flow being measured.

A further object is to reduce the time lag of the apparatus to a minimum, i. e., to minimize the delay between the time at which fluctuation in flow occurs and the time at which that fluctuation is made manifest by the instrument.

Another object of my invention is to make the apparatus highly sensitive to extremely minute changes in rate of flow, as, for example, to the variation in rate resulting from rainfall fluctuation of less than one-tenth of an inch per hour.

Still another object in this same connection is so to design the several parts of the apparatus, and so to inter-associate them, that the instrument is most sensitive to fluctuations which occur within the most significant ranges.

A further object is so to design the bucket that upon cessation of the flow which it is instrumental in measuring the bucket will be drained substantially completely dry, even to the extent of substantially preventing the retention of drops of water clinging to the outer surface of the bucket, which, if present, would have the tendency to impair the accuracy of its measurement of subsequent flows.

Among the general objects of my invention is the provision of apparatus for measuring rate or intensity of flow, composed of only a small number of parts of simple and rugged design, and which is capable of operating dependably, efficiently and with the utmost accuracy, even after having been left idle over prolonged periods of time.

The invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claims.

Referring to the drawing.

Figure 1:
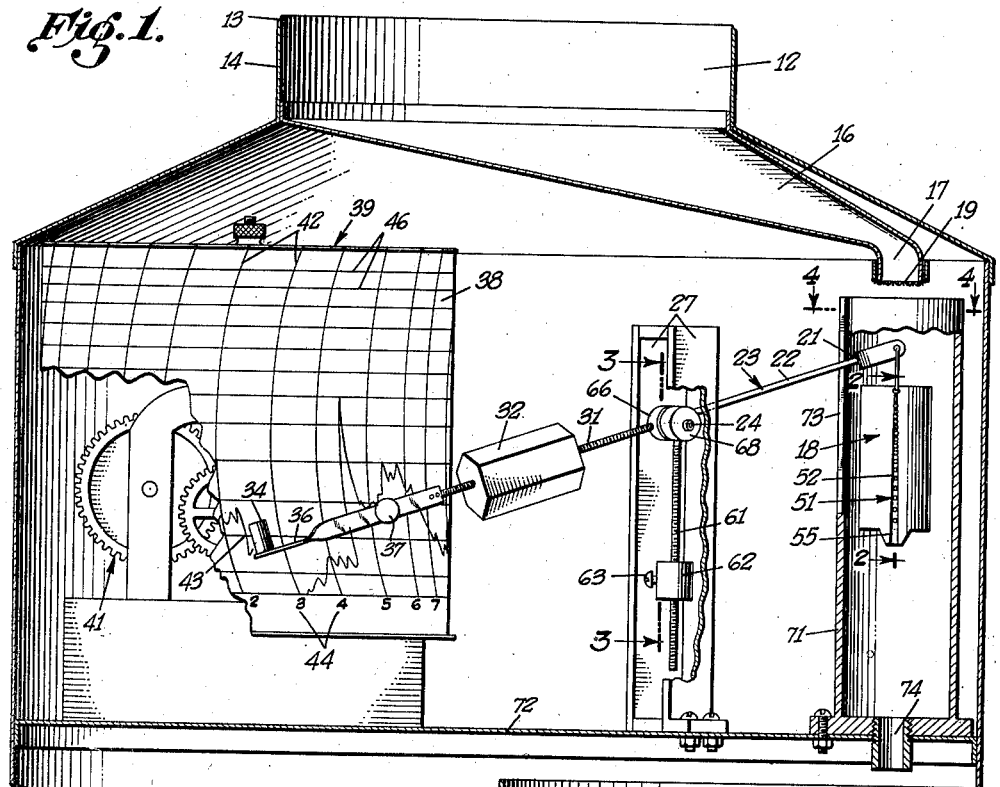
Figure 1 is a transverse, vertical sectional view of a measuring and recording instrument incorporating the principles of the present invention. Portions of the figure are broken away the better to disclose details of construction and other portions of the figure are broken away to reduce its size.
Figure 5:
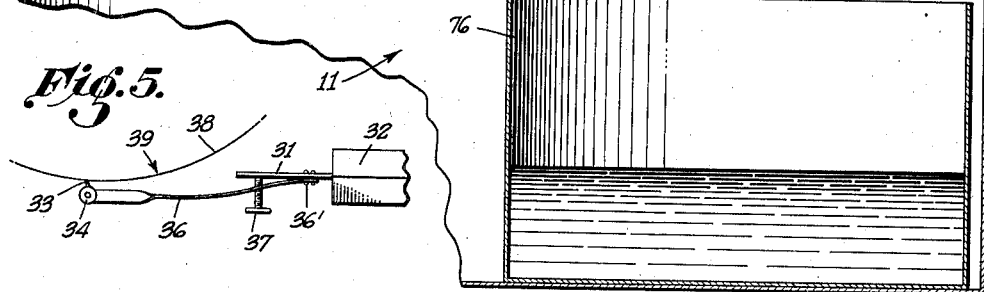
Figure 5 is a detail view in top plan of the other end of the scale beam and the capillary pen carried thereby.
Figure 2:
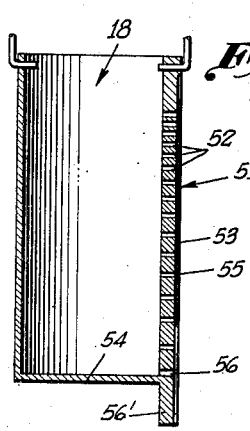
Figure 2 is a transverse, vertical sectional view taken through the flow-receiving bucket, the plane of section being indicated by the line 2—2 of Fig. 1 and the direction of view by the arrows.
Figures 3, 4:
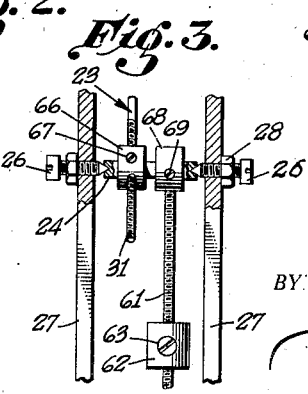
Figure 3 is a slightly enlarged view of the fulcrum for the scale beam, the plane of section being indicated by the line 3—3 of Fig. 1 and the direction of view by the arrows.
Figure 4 is a top plan view of the flow receiving bucket and the associated end of the scale beam. This view may be considered as a horizontal section taken through the upper end of the tubular shield within which the bucket is disposed, the plane of section being indicated by the line 4—4 of Fig. 1 and the direction of view by the arrows.

In terms of broad inclusion the device of the present invention comprises a movably supported bucket adapted to receive therein the flow of liquid to be measured, and having a series of perforations in its wall at various distances above its bottom so that the number of perforations through which liquid will flow depends upon the quantity of liquid within the bucket at any given time. That is to say, the greater the quantity of liquid within the bucket the more of the discharge orifices through which the liquid can flow, thus making it possible to establish equilibrium between the rates of flow into and out of the bucket within a minimum of time after any fluctuation of flow has occurred. The movable bucket is supported in such a manner that it and its contents are acted upon by the force of gravity so as to cause the weight of, and consequently the quantity of liquid within the bucket at any given time. It is apparent, therefore, that the distance that the bucket is caused to move is determined by the rate, or intensity, of the flow being measured. Therefore, observation of the position taken by the scale beam will give a visual reading as to the rate of flow at any given time; and by equipping the scale beam with suitable marking means such as a capillary pen disposed in suitable relationship to a movable drum carrying a record sheet, a permanent graph or chart can be made showing the fluctuations in rate of rainfall.

More specifically described, my improved rain gauge is mounted within a suitable housing 11, preferably of substantially cylindrical form, and having an opening 12 at the top of predetermined cross sectional area. In order to facilitate comparison of the record made by the flow gauge of the present invention, I prefer that the opening 12 correspond in diameter to that of the conventional cumulative rain gauge, i. e., eight inches. The upper edge 13 of the housing defining the opening 12 is preferably relatively sharp, the interior surface being straight and the outer surface sloping downwards and outwards to the outer surface of an upstanding neck 14, the purpose being to enhance the accuracy with which the collector opening 12 will gather exactly that amount of rain which would fall upon a flat circular area eight inches in diameter. Were the upper edge of the upstanding neck 14 flat instead of sharp as described, there would be a greater tendency for drops of rain impinging against the upper edge to splash into the opening 12, whereas when the sharp edge 13 described is presented any drops striking thereupon will be sheared and just the proper portion thereof will fall within the opening 12 and the remainder will run down the outside surface of the neck 14.

The upstanding neck 14 leads to a funnel structure 16 which preferably conducts all liquid gathered by the opening 12 off to one side where its spout 17 is adapted to deliver all of the water thus collected into a bucket 18 disposed immediately therebelow. Preferably the spout 17 is provided with a removable screen 19 adapted to remove any solid particles which might otherwise be carried into the bucket 18 and impair the efficiency of its operation.

The bucket 18 is supported, through the expedient of a yoke 21, upon one end 22 of a scale beam 23. This scale beam 23 is mounted for rocking movement upon a suitable trunnion 24 carried by opposed adjustable screws 26 the ends of which preferably are pointed and seated in axially disposed recesses in the ends of the trunnion shaft 24. Preferably just the points of the screws 26 make contact with the trunnion shaft 24 at the bottoms of the respective recesses in the ends of the shaft so as to add to the sensitivity of the scale beam to the slightest fluctuation in the weight of the contents of the bucket 18. The screws 26 are threaded through vertical brackets 27; preferably each screw 26 carries a lock nut 28 whereby the screw 26 can be fastened in selected position.

The other end 31 of the scale beam 23 carries a counterbalance 32 which preferably is threaded upon the scale beam 23 so as to permit its being shifted backwards and forward, making it possible to attain the greatest accuracy of counterbalancing of the bucket 18. The end 31 also carries a capillary pen 33 and ink reservoir 34 therefor. This pen 33 is carried by an extension 36 of spring metal fastened to the end 31 of the scale beam as by rivets 36'. An adjusting screw 37 is threaded through the spring leaf 36 and bears against the end 31 of the scale beam whereby to adjust the degree of pressure with which the pen 31 bears against a chart 38 which is carried by a drum 39 disposed in cooperative relationship to the pen 33. The drum 39 is adapted to be driven at constant speed by a suitable clockwise mechanism indicated in its entirety at 41; and inasmuch as the details of the clockwork mechanism form no portion of the present invention it is referred to in general terms only in this specification. Suffice it for the purpose of the present disclosure to explain that the clockwork mechanism 41 causes the drum 39 to rotate at the desired speed, that rate under most circumstances of installation being once each 24 hours. When so arranged, a graph corresponding in length to the circumference of the drum 39 will show fluctuations in rainfall over a 24-hour period. Convenience is afforded, therefore, by employing chart paper which is divided by substantially vertical lines 42, spaced apart a distance corresponding to any preferred unit of time. Hence, that portion of the line 43 drawn by the pen 33 between two adjacent time lines 42 will show the fluctuations in rainfall during the period indicated by that space on the chart. It is convenient, therefore, to identify the vertical lines 42 by indicia 44, preferably in the form of consecutively arranged numerals identifying each of the vertical lines 42 with the particular time of day to which it corresponds. The chart 38 is also provided with a series of horizontally extending lines 46 which are preferably spaced apart at gradually increasing distances from the top to the bottom of the chart 38 for a purpose to be explained hereinbelow.

As stated, rainfall gathered by the collector opening 12 will be delivered by the spout 17 into the bucket 18. This bucket is provided with a series 51 of discharge orifices 52 arranged at various heights above the bottom 54 of the bucket 18. That wall 53 of the bucket 18 within which the orifice 52 are provided is of substantial thickness, hence each of the orifices 52 is of sufficient length to cause it to develop the action of a capillary tube, the purpose being to cause each of the orifices to discharge liquid from the interior to the exterior of the bucket without the necessity of the development of pressure head to cause flow through that orifice. I have found that if each orifice is of very small diameter, say 0.01 inch, and relatively long as compared with its diameter, say an eighth of an inch, each orifice will start discharging water therethrough just as soon as the surface of the water reaches the lower edge of that orifice. This I attribute to the action of capillarity which overcomes the surface tension upon the water within the bucket and causes the water to flow through an orifice even though the level of the water has not been raised above it.

This action of the tubular orifices 52 is enhanced by a vertically extending groove 55 in the outer surface of the bucket 18, with which all of the orifices 52 lead at their outer ends, so as to discharge thereinto. Actual test has proven that a groove so arranged aids greatly in causing liquid to run down the wall of the bucket immediately upon its emergence from any of the orifices, without adhering to the bucket wall at the mouth of the orifice until a large drop has accumulated, as in the case of a bucket, the orifices of which do not lead into such a groove.

So pronounced is the capillary action thus developed that by placing the lowermost orifice 56 so that its lower edge is substantially in alignment with the upper surface of the horizontal bottom 54 of the bucket this lowermost orifice 56 will drain the bucket almost completely. The capillarity developed by the lowermost orifice 56 has the tendency to suck water off the upper surface of the bottom 54, leaving the bucket almost if not quite completely dry after flow into the bucket from the spout 17 has ceased. Toward this same end I prefer to provide a dependent apron or skirt 56′ extending downwards from the bottom 54 on that side 53 of the bucket within which the orifices 52 are disposed. This apron 56′ serves to drain or bleed even the smallest drops off from the bucket 18, preventing their adhering to the undersurface of the bucket. Preferably, the orifices 52 are not equally spaced apart. The spacings between the orifices 52 near the bottom of the bucket are wider than those between the orifices nearer the upper end of the series 51. Preferably these spacings are graduated, becoming gradually less from the bottom to the top of the bucket. This arrangement makes for greater sensitivity of the bucket to fluctuations in the rate of rainfall in the lower ranges. Consider, for example, that it is raining hard enough to maintain a volume of liquid within the bucket just covering the two lowermost orifices 52 and then the rate of rainfall increases sufficiently to raise the level of the liquid to the next, i. e., the third orifice. Inasmuch as the distance between the second and third orifices is relatively great as compared to the spacing between orifices nearer the top of the bucket, a considerably greater change in the weight of the contents of the bucket will be developed than would be the case if the same change in rate occurred by starting from a rate of rainfall which would cause a greater quantity of liquid to be accumulated within the bucket.

Importance of this detail lies in the fact that fluctuation in rainfall rate in the lower ranges is more significant than the same amount of fluctuation in the higher ranges; e. g., starting with a rate of rainfall at, say, 0.01 inch per hour, if the rate of rainfall should increase 0.05 inch per hour, a 50% increase had occurred. However, if it already is raining at the rate of 1.0 inch per hour and then the same increase in rate occurs, i. e., 0.05 inch per hour, there will be the same change in rate. However, this change is so small compared with the rate occurring when the change took place that it is substantially negligible. Under most circumstances rainfall of 1 inch per hour is substantially the same as a rate of 1.05 inches per hour. This explains why it is more desirable to have the instrument of the present invention more sensitive to fluctuations in weight in the lower ranges.

Toward this same end means are also provided for making the amount of movement of the scale beam 23 affected by each unit increase in weight of the contents of the bucket, greater when only a small amount of water is disposed within the bucket then when a relatively great amount is contained therein. This means comprises a threaded rod 61 extending downward from the trunnion 24 and fastened thereto in such position that the rod 61 extends vertically downwards when the bucket 18 is raised to its upper extreme of motion. The rod 61 carries a weight 62 threadedly engaged upon the rod and adapted to be anchored thereon in selected position as by a set screw 63. Both ends 22 and 31 of the scale beam 23 are anchored fast to the trunnion 24, the preferable construction therefor comprising a collar 66 into the opposed sides of which the respective ends 22 and 31 of the scale beam are threaded. The collar 66 is made fast to the trunnion shaft 24 as by set screw 67, thus holding both ends of the scale beam 23 rigid with the trunnion shaft 24. The threaded rod 61 is similarly made fast to the trunnion shaft 24 through the expedient of another collar 68 and set screw 69, which makes it possible not only to anchor the rod 61 with respect to the trunnion shaft but also to adjust it to extend exactly vertical when the bucket 18 is in its upper extreme of motion.

Preferably the bucket 18 is disposed within a tubular shield 71 upstanding from the horizontal partition 72 upon which the brackets 27 are mounted. This shield 71 has a vertical slot 73 therein within which the end 22 of the scale beam is accommodated to permit the scale beam 23 to swing about the axis of its trunnion when the weight of the bucket 18 and its contents increases. In the bottom of the shield 71 a discharge tube 74 is provided through which water discharged from the bucket 18 can flow preferably into a conventional rain gauge 76 disposed within the housing 11 below the partition 72 and directly under the discharge tube 74.

Operation

Although the apparatus hereinabove described can be used for measuring substantially any liquid flow of low intensity, it is designed primarily for measuring rainfall. For this purpose the apparatus should be mounted in an exposed location so that rain can fall freely into the opening 12 at the top of the instrument. The rainfall collected will be delivered into the bucket 18 where a quantity of water will be accumulated which bears a predetermined relationship to the rate of rainfall. This is explained by the fact that the harder it is raining at any given time the more water will collect within the bucket. Of course the higher the level reached by the water within the bucket the more of the discharge orifices 52 through which the water will run. It is apparent, therefore, that whenever a fluctuation in the rate of rainfall occurred equilibrium very quickly will be established between the rates of flow into and out of the bucket but only after the quantity of water trapped within the bucket corresponds to the rate at which it is then raining. This phenomenon is true even when the fluctuation in rainfall is so slight that the level of the water within the bucket does not pass any one of the orifices. For example, if at the start it is raining hard enough to bring the level of the water to just above the second orifice and then the rainfall increases slightly but not enough to raise the level of the water to the third orifice, still the rate at which water is discharged from the bucket will increase because of the fact that the pressure head upon the two orifices then covered will increase and cause the water to flow through those two orifices at a more rapid rate, soon establishing equilibrium between the rates of flow into and out of the bucket even though the number of orifices through which the water is being discharged has not been increased.

It is apparent, therefore, that the quantity of water entrapped within the bucket at any time is a certain predetermined function of the rate at which rain is then falling; and inasmuch as the bucket is carried by one end of the scale beam 23, this beam will be caused to swing through a distance which also bears a predetermined relationship to the weight of the contents of the bucket. Consequently the distance that the scale beam swings also is a certain predetermined function of the rate of rainfall. However, during only a relatively light rain, a relatively small quantity of water will be entrapped within the bucket 18 causing the scale beam 23 to swing through only a relatively small distance and displacing the weight 62 on the rod 61 only slightly from directly under the trunnion shaft 24. However, during a heavier rainfall, the scale beam will be thrown farther and the weight 62 will be displaced farther from the vertical under the axis about which the scale beam swings. Obviously the further the weight 62 swings out from under the trunnion shaft 24 the greater will be the downward component of the gravitational force exerted upon the weight 62. Therefore, the further the scale beam 23 is swung from its zero position the less sensitive the scale beam becomes to fluctuations in the weight of the contents of the bucket. This effect, however, is variable due to the fact that the weight 62 can be moved to any desired position upon the rod 61 by loosening the set screw 63 and then rotating the weight 62 upon the threads by means of which it is engaged upon the rod. The further the weight 62 is from the trunnion the greater will be the dampening effect that it has upon the sensitivity of the scale beam to fluctuations and the weight of the bucket's contents. It is apparent, therefore, that the further the scale beam swings from the zero position the less sensitive it will be to fluctuations in the rates at which liquid is flowing into and out of the bucket. In other words, the higher the capillary pen 33 moves on the chart paper the less sensitive it is to fluctuations in the rate of rainfall. It is because of this feature that it is desirable to have the horizontal lines 46 closer together near the top of the sheet than near the bottom.

The adjustability of the weight 62 facilitates the step of limiting the range of movement of the capillary pen 33 to the confines of the chart paper 38. In order to attain the greatest accuracy of reading it is desirable of course to expand the scale of the graph 43 drawn by the pen just as much as possible as determined by the available width of the chart paper 38. Therefore, it is desirable to have the weight 62 as high upon the rod 61 as the available width of the chart paper 38 will permit. After the paper has been positioned upon the drum 39, the scale beam 23 should then be adjusted so that the pen 33 contacts the chart paper 38 on its zero line, i. e., the horizontal line 46 corresponding to a zero rainfall. This is accomplished by means of the adjustable counterbalance 32; and when the beam 23 is so balanced, the rod 61 should be fastened to the shaft 24 so as to extend vertically downwards from the trunnion shaft 24, with the scale beam 23 in its described zero position. This will cause the scale beam 23 to hang naturally, i. e., in equilibrium with the pen 33 in proper position for zero reading. Then to fit the extent of motion of the scale beam to the particular ruling of chart paper 38 then employed, the weight 62 should be adjusted upon the rod 61 so as to cause the pen 33 to move the proper distance over the paper 38; i. e., past the appropriate number of perpendicular lines 46 which is appropriate to any given rate of flow into and out of the bucket 18.

I claim:

1. In a device for measuring flow intensity, a scale beam, a bucket carried by one end thereof, a liquid receiver and means for delivering fluid received thereby into said bucket, said bucket having a plurality of discharge orifices at different heights above its bottom whereby the rates of flow into and out of said bucket are equalized when the quantity of liquid within said bucket bears a predetermined relationship to the rate of inflow.

2. In a device for measuring flow intensity, liquid receiving means, and a bucket adapted to receive liquid therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of liquid therein the weight of which is a predetermined function of said rates.

3. In a device for measuring flow intensity, liquid receiving means, and a bucket adapted to receive liquid therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of liquid therein the weight of which is a predetermined function of said rates, each of said orifices being of sufficiently small bore and sufficiently great length to develop capillary action therein.

4. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, the lower edge of the lowest of said orifices being substantially level with the upper face of the bottom of said bucket whereby said bucket is drained substantially completely dry upon cessation of flow thereinto.

5. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, each of said orifices being of sufficiently small bore and sufficiently great length to develop capillary action therein and the lower edge of the lowest of said orifices being substantially level with the upper face of the bottom of said bucket whereby said bucket is drained substantially completely dry upon cessation of flow thereinto.

6. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, and means below said orifices for guiding liquid past the bottom of said bucket to minimize the tendency for drops to adhere to the outer surface of said bucket.

7. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, and a downward extension on the wall of said bucket below said orifices for guiding drops away from the bottom of the bucket.

8. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, each of said orifices being of sufficiently small bore and sufficiently great length to develop capillary action therein, and means below said orifices for guiding liquid past the bottom of said bucket to minimize the tendency for drops to adhere to the outer surface of said bucket.

9. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, the lower edge of the lowest of said orifices being substantially level with the upper face of the bottom of said bucket whereby said bucket is drained substantially completely dry upon cessation of flow thereinto, and means below said orifices for guiding liquid past the bottom of said bucket to minimize the tendency for drops to adhere to the outer surface of said bucket.

10. In a device for measuring rainfall intensity, rain gathering means of predetermined horizontal area, and a bucket adapted to receive rain therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of water therein the weight of which is a predetermined function of said rates, said orifices being more widely separated adjacent the bottom of said bucket to increase the sensitivity of weight fluctuation to variation of rate of inflow in the lower ranges of rainfall rate.

11. In a device for measuring flow intensity, liquid receiving means, a bucket adapted to receive liquid therefrom, means for mounting said bucket for movement through a distance bearing a predetermined relationship to the weight of its contents, said bucket having a series of discharge orifices arranged at various heights above its bottom to establish equilibrium between the rates of flow into and out of said bucket by accumulating a quantity of liquid therein the weight of which is a predetermined function of said rates, and means for recording movements of said bucket.

12. In a device of the character described, a bucket, means for directing a flow of liquid thereinto, and means for discharging liquid from said bucket at a gradually faster rate as the quantity of liquid within said bucket increases and thereby establishing equilibrium between the rates of flow into and out of said bucket only after a quantity of liquid has accumulated within said bucket which is distinctive to those rates, said liquid-discharging means comprising a series of orifices arranged at various heights above the bottom of said bucket, at least the lowermost of said orifices being of sufficiently small bore and sufficiently great length to develop capillary action therein, whereby said bucket is drained substantially completely dry upon cessation of flow thereinto.

13. In a device of the character described, a bucket, means for directing a flow of liquid thereinto, and means for discharging liquid from said bucket at a gradually faster rate as the quantity of liquid within said bucket increases and thereby establishing equilibrium between the rates of flow into and out of said bucket only after a quantity of liquid has accumulated within said bucket which is distinctive to those rates, said liquid-discharging means comprising a series of orifices arranged at various heights above the bottom of said bucket, the lower edge of at least the lowermost of said orifices being level with the upper surface of the bottom of said bucket, and at least said lowermost orifice being of sufficiently small bore and sufficiently great length to develop capillary action therein, whereby said bucket is drained substantially completely dry upon cessation of flow thereinto.

14. In a device of the character described, a bucket, means for directing a flow of liquid thereinto, and means for discharging liquid from said bucket at a gradually faster rate as the quantity of liquid within said bucket increases and thereby establishing equilibrium between the rates of flow into and out of said bucket only after the accumulation within said bucket of a quantity of liquid which is distinctive to those rates, said liquid-discharging means comprising a series of orifices arranged at various heights above the bottom of said bucket and a substantially vertically extending groove in the outer face of said bucket into which the outer ends of said orifices empty.

15. In a device of the character described, a bucket, means for directing a flow of liquid thereinto, and means for discharging liquid from said bucket at a gradually faster rate as the quantity of liquid within said bucket increases and thereby establishing equilibrium between the rates of flow into and out of said bucket only after the accumulation within said bucket of a quantity of liquid which is distinctive to those rates, said liquid-discharging means comprising a series of orifices arranged at various heights above the bottom of said bucket, a substantially vertical groove in the outer face of said bucket into which the outer ends of said orifices empty, and a lip extending downwards from a wall of said bucket below said orifices and beyond the bottom of the bucket to guide drops away from said bottom, said groove extending across said lip to the lower edge thereof.

FREDERICK J. CORNICK.